July 28, 1942.    G. E. BREEZE    2,291,141
DIRECTION SIGNAL SWITCH
Filed Dec. 6, 1940
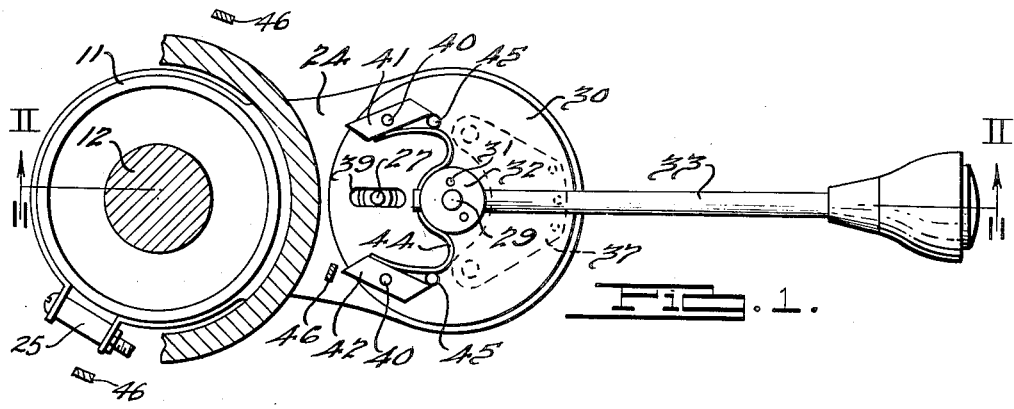
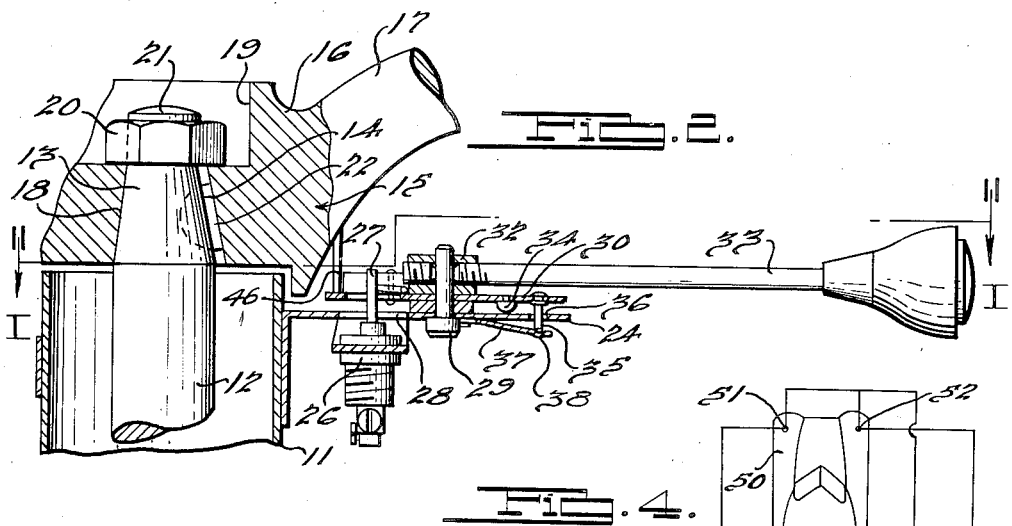
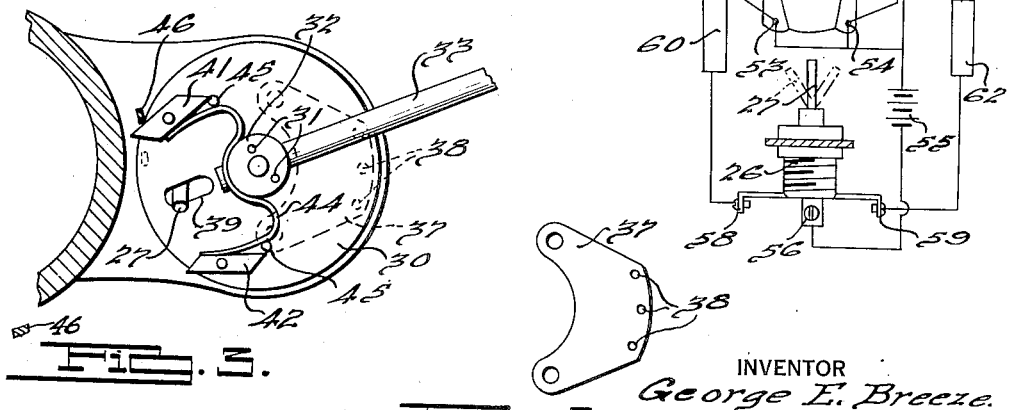
INVENTOR
George E. Breeze.
BY
ATTORNEYS.

Patented July 28, 1942

2,291,141

UNITED STATES PATENT OFFICE 2,291,141

DIRECTION SIGNAL SWITCH

George E. Breeze, Highland Park, Mich., assignor to Chrysler Corporation, Highland Park, Mich., a corporation of Delaware Application December 6, 1940, Serial No. 368,746

1 Claim. (Cl. 200—59)

My invention relates to signal light switching mechanisms and more particularly to a device of this character which is adapted to be used on motor vehicles.

One object of my invention is to provide a new and improved switching mechanism for controlling the operation of directional signals.

An additional object is to provide a switch that is rugged and which will not easily get out of order, yet which is easy and cheap to manufacture.

A further object of my invention is to provide a switch which may be manually actuated prior to the turning movement of a motor vehicle and is automatically returned to its neutral position as soon as the turning movement of said vehicle has been completed.

Further objects and advantages of my invention will be apparent from the following detailed description, reference being had to the accompanying drawing in which:

Fig. 1 is a plan view of the switch mechanism embodying my invention with the cover thereof removed, the section being taken on line I—I of Fig. 2.

Fig. 2 is a sectional side elevational view of my invention, the section being taken on the line II—II of Fig. 1, and viewed in the direction indicated by the arrows.

Fig. 3 is a fragmentary plan view, partly in section, showing the mechanism in Fig. 1 in one of its operative positions.

Fig. 4 is a diagrammatic view of the electrical connections of the switch with relationship to the motor vehicle signal lights, and, Fig. 5 is a detail view of a part of the switch control mechanism.

Referring to the drawing, I have shown a steering column 11, surrounding a steering column shaft 12, the latter having a tapered top portion 13 provided with a keyway 14. A steering wheel generally indicated at 15 comprises a hub 16 and spokes, one of which is shown at 17, which support a steering wheel rim, not shown. The steering wheel hub 16 is provided with a tapered hole 18 which is adapted to fit the tapered top portion 13 of the shaft 12, a counter bore 19 being provided in the hub for receiving a nut 20 threaded on the upper extremity 21 of the end portion 13 of the shaft 12 for securing the wheel 15 to the shaft. To prevent rotation of the wheel 15 with respect to the shaft 12, the tapered top portion 13 and the hub 16 are keyed together by a key 22.

A substantially circular supporting bracket 24 is securely held to the steering column shell 11 by a clamp 25. Mounted on the lower side of said bracket 24 is a toggle switch 26 having a switch actuating finger 27, which extends upwardly through an opening 28 in the bracket 24. Pivotally mounted on said bracket by means of a pin 29 is a circular plate 30 to which is secured, by means of pins 31, a hub member 32. Secured to the hub member 32 and adapted to rotate the circular plate 30 is a handle 33. The circular plate 30 and bracket 24 are held in spaced parallel relationship by a plurality of rivet heads 34 only one of which is shown. The plate 30 is provided with a small pin 35 depending therefrom and extending through an arcuate slot 36 in the bracket 24. Secured to the lower side of the bracket 24 is a flat spring 37 provided with three spaced openings or detents 38, only one of which is shown, all disposed in the arcuate path of the pin 35 in its normal course of travel, and for a purpose to be later described.

The switch actuating finger projects upwardly through a relatively long narrow slot 39 in the rotatable plate, so that it is maintained in its vertical or neutral position when the plate 30 and handle 33 are in the position shown in Fig. 1. When the plate 30 is moved to the position shown in Fig. 3, which is the position for indicating a right turn, the sides of the slot 39 engage the finger 27 and move it to an inclined position, which throws the toggle switch 26 to one of its energized or signalling positions. In one of its angular positions the switch causes the signal lights on the left hand side of the car to indicate a left turn, in its vertical position the directional signals are deenergized, and in its other angular position the signal lights on the right hand side of the car indicate a right turn. The three openings or detents 38 in the spring plate 37 correspond to the three positions of the plate 30 when the switch is in its various positions. The resiliency of the spring plate 37 pressing against the pin 35 serves to hold the plate 30 in the position to which it has been moved until the handle 33 is moved with sufficient pressure to force the pin 35 out of the detent in the spring plate.

Pivotally mounted on the circular plate 30 by means of pins 40 are two dogs 41 and 42. The dogs are each held in position by a flat spring 44 and stop pins 45. The spring 44 tends to urge the dog 41 in a clockwise direction, and to urge the dog 42 in a counterclockwise direction, the stops 45 limiting the extent of such rotation. When the switch is in its right turn indicating position, as illustrated in Fig. 3, dog 41 is disposed in the path of a finger 46, of which there are several, depending from the steering wheel 15, and the pin 35 is disposed in one of the outer of the three spaced openings or detents 38, said opening holding the switch finger 27 in one of its inclined positions, for energizing the signal lights on the right side of the car. As the steering wheel 15, and its depending finger 46 move in a clockwise direction to initiate the right hand turn, the finger 46 engages but passes by the dog 41 because of the small counterclockwise movement of the dog permitted by the spring 44. However, when the wheel 15 and finger 46 move in a counterclockwise direction as when the wheels are being restored to a straight ahead position after having completed the turn, the dog 41 is prevented from clockwise movement by the stop 45 and the finger pushes the dog and also the switch back to its neutral position as illustrated in Fig. 1, thus automatically deenergizing the signalling system.

In Fig. 4, I have illustrated the electrical connection of the toggle switch 26 with respect to the directional signal light system. I have shown diagrammatically a car 50, having forwardly visible signal lights 51 and 52 and rearwardly visible signal lights 53 and 54. A battery 55 has one terminal connected to each of the lights 51 to 54, inclusive, and its other terminal is connected to a central terminal 56 of the switch 26. The switch has two other contacts 58 and 59. The contact 58 is connected through a circuit interrupter 60 to the front light 51 and the rear light 53 on the left hand side of the car 50 and the contact 59 is connected through a circuit interrupter 61 to the lights on the right hand side of the car. Therefore, in operation, the inclination of the switch actuating finger 27 to the right as viewed in Fig. 4 will cause current to flow from the battery 55 through the terminal 56, the switch 26, the terminal 59 through the circuit interrupter 61, the signal lamps 52 and 54 on the right hand side of the car 50, and back to the battery 55, and thereby completing the signal circuit. It is understood that movement of the finger 27 to the left will cause the left hand lights to operate in a similar manner.

From the foregoing description it will be apparent that when the signal controlling handle 33 is in its neutral position, the dogs 41 and 42 are disposed out of the path of the steering wheel fingers 46, and that they move into the path of the fingers 46 only when the signal switch has been energized. Any amount of movement of the steering wheel in the direction indicated by the signal may occur without interference in any way with the switch. However, any movement of the steering wheel in the opposite direction immediately restores the switch to a neutral position. As a result, if the hand lever is accidentally set to indicate a right hand turn when a left hand turn is intended, the initial movement of the steering wheel toward making a left hand turn returns the switch to its neutral position, whereupon it may be reset properly by the operator. The signal may, of course, be returned to its neutral position manually, if desired.

Although I have illustrated but one form of my invention and have described in detail but a single application thereof, it will be apparent to those skilled in the art that it is not so limited but that various modifications and changes may be effected therein without departing from the spirit of my invention or the scope of the appended claim.

I claim:

In combination with a vehicle steering wheel, direction signal control mechanism including a supporting plate; a double throw switch mounted on said supporting plate, said switch having an operating lever protruding therefrom and extending through a slot formed in said supporting plate for accommodating said operating lever; a movable plate pivotally carried on said supporting plate having a slot therein for receiving said switch operating lever; a second slot in said supporting plate; a pin carried by said movable plate and extending into said last mentioned slot; detent means carried by said supporting plate in engagement with said pin for yieldably holding said movable plate in neutral and in right and left turn indicating positions; right and left hand stops carried by said movable plate; right and left hand lugs pivotally carried on said movable plate in engagement with said stops, resilient means carried by said movable plate for urging said lugs against said stops, an actuating lug carried by said steering wheel and arranged with respect to said pivoted lugs such that it will engage one or the other thereof upon turning of said wheel when said mechanism is set to signal a turn whereby the pivoted lug so engaged will pivot against said resilient means and thereby permit the actuating lug to pass or bear against its stop whereby the mechanism will be moved back to neutral position in accordance with the direction of turning of said wheel.

GEORGE E. BREEZE.